United States Patent [19]

Nagamura

[11] 4,085,446
[45] Apr. 18, 1978

[54] DATA STORAGE AND RETRIEVAL SYSTEM

[76] Inventor: Fumitaka Nagamura, 1-6-14 Tomigaya, Shibuya-ku, Tokyo, Japan

[21] Appl. No.: 715,195

[22] Filed: Aug. 17, 1976

Related U.S. Application Data

[63] Continuation-in-part of Ser. No. 582,193, May 30, 1975, abandoned.

[30] Foreign Application Priority Data

Jun. 1, 1974 Japan .................. 49-62142

[51] Int. Cl.² .......... G06F 15/40; G06F 7/10; G06F 3/02; G06F 13/06
[52] U.S. Cl. .................. 364/900; 235/449; 235/493
[58] Field of Search ........... 340/172.5, 365 R, 324 M; 235/145, 146, 61.11 D, 61.6 R; 353/25, 30, 35; 35/5, 6, 8 R, 8 A, 9 A, 10; 360/2

[56] References Cited

U.S. PATENT DOCUMENTS

| | | |
|---|---|---|
| 3,158,317 | 11/1964 | Alexander .................. 340/365 R |
| 3,332,071 | 7/1967 | Goldman .................. 340/172.5 |
| 3,528,181 | 9/1970 | Arbon .................. 35/9 A |
| 3,534,396 | 10/1970 | Hart .................. 340/172.5 |
| 3,829,844 | 8/1974 | Zonneveld .................. 340/172.5 |
| 3,839,708 | 10/1974 | Bredesen .................. 340/172.5 |
| 3,852,716 | 12/1974 | Horn .................. 340/172.5 |
| 3,859,635 | 1/1975 | Watson .................. 340/172.5 |
| 3,943,493 | 3/1976 | Shelton .................. 340/172.5 |

*Primary Examiner*—James D. Thomas
*Attorney, Agent, or Firm*—Wenderoth, Lind & Ponack

[57] ABSTRACT

A data storage and retrieval system facilitates interface between a human operator and a digital processing system or computer, by first manually selecting visual human word(s) in an identification table overlaid on a display board and next automatically retrieving information by its corresponding address code in conjunction with a magnetic card. Moreover, since the identification table and magnetic card are replaceable from one item block to another item block, numerous arbitrary and repeatable combinations of requested words and their corresponding addresses a different item block can be easily made for many different operators and themes by applying data processing and versatile programming.

3 Claims, 17 Drawing Figures

Fig. 1
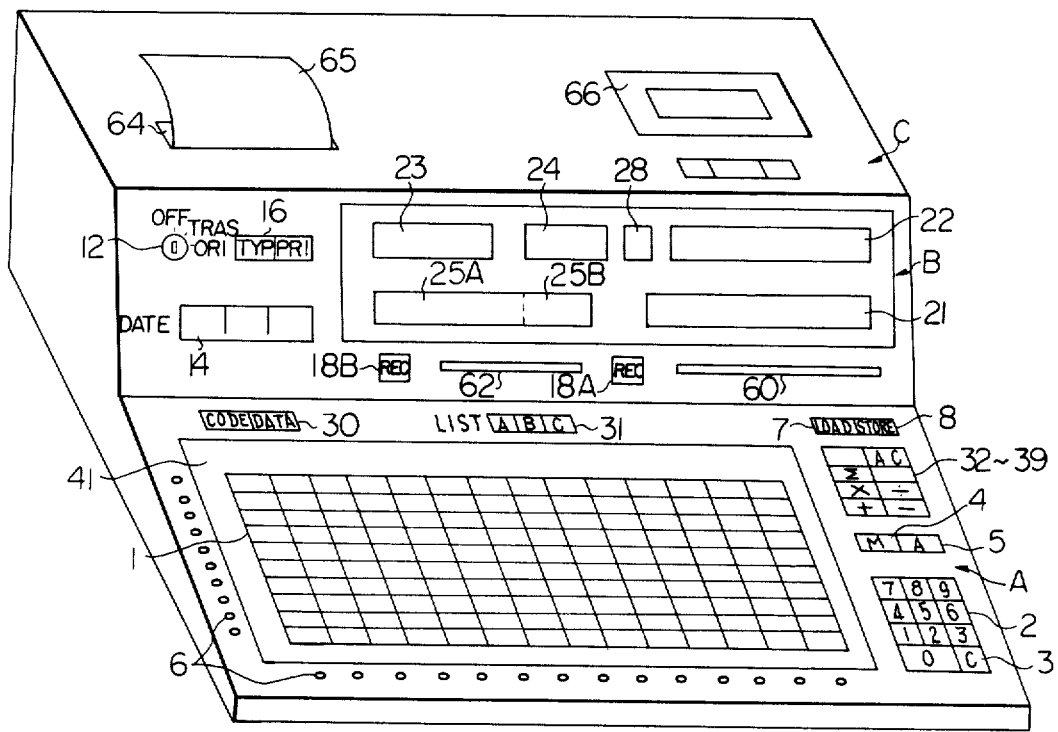
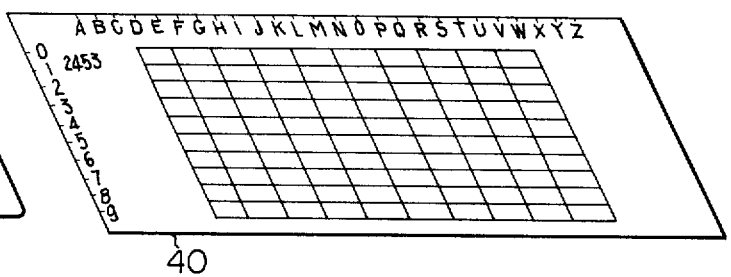

|   | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| 0 | | | | | | | | | | | | | | | | | | | | | | | | | | |
| 1 | | | | | | | | | | | | | | | | | | | | | | | | | | |
| 2 | | | | | | | | | | | | | | | | | | | | | | | | | | |
| 3 | | | | | | | | | | | | | | | | | | | | | | | | | | |
| 4 | | | | | | | | | | | | | | | | | | | | | | | | | | |
| 5 | | | | | | | | | | | | | | | | | | | | | | | | | | |
| 6 | | | | | | | | | | | | | | | | | | | | | | | | | | |
| 7 | | | | | | | | | | | | | | | | | | | | | | | | | | |
| 8 | | | | | | | | | | | | | | | | | | | | | | | | | | |
| 9 | | | | | | | | | | | | | | | | | | | | | | | | | | |

(B)

| SUN | MON | TUE | WED | THU | FRI | SAT |
|---|---|---|---|---|---|---|
| | | | | | | |
| | | | | | | |
| | | | | | | |
| | | | | | | |
| | | | | | | |

(C)

|    | A | B | C | D | E | F | G | H | I | J | K | L | M | N | O | P | Q | R | S | T | U | V | W | X | Y | Z |
|----|---|---|---|---|---|---|---|---|---|---|---|---|---|---|---|---|---|---|---|---|---|---|---|---|---|---|
|    | JAN | | FEB | | MAR | | APR | | MAY | | JUN | | JUL | | AUG | | SEP | | OCT | | NOV | | DEC | | | |
| 1  | | | | | | | | | | | | | | | | | | | | | | | | | | |
| 2  | | | | | | | | | | | | | | | | | | | | | | | | | | |
| 3  | | | | | | | | | | | | | | | | | | | | | | | | | | |
| 4  | | | | | | | | | | | | | | | | | | | | | | | | | | |
| 5  | | | | | | | | | | | | | | | | | | | | | | | | | | |
| 6  | | | | | | | | | | | | | | | | | | | | | | | | | | |
| 7  | | | | | | | | | | | | | | | | | | | | | | | | | | |
| 8  | | | | | | | | | | | | | | | | | | | | | | | | | | |
| 9  | | | | | | | | | | | | | | | | | | | | | | | | | | |
| 10 | | | | | | | | | | | | | | | | | | | | | | | | | | |

PRINT-OUT FORMAT

Fig. 14
(A) SERIAL CODE SYSTEM
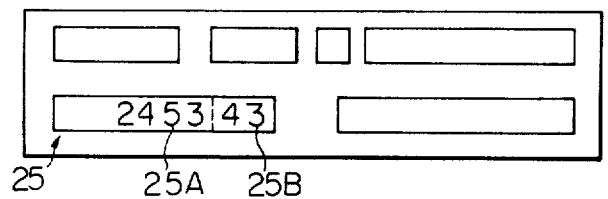
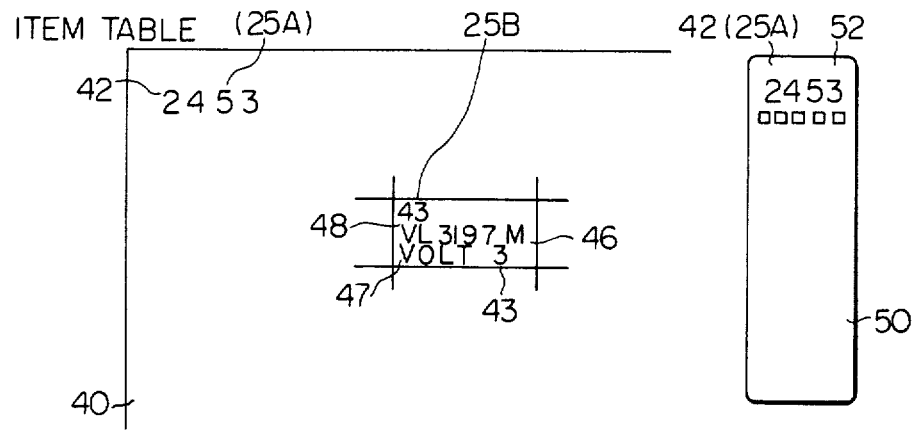
(B) RANDOM CODE SYSTEM
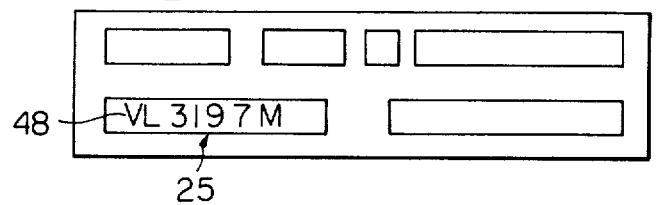

Fig. 15
(A) DATA PROCESSING
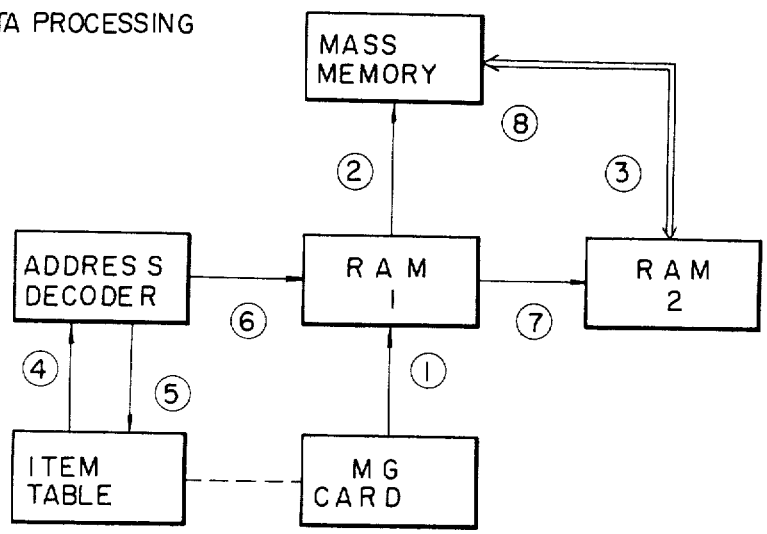
(B) PROGRAMMING
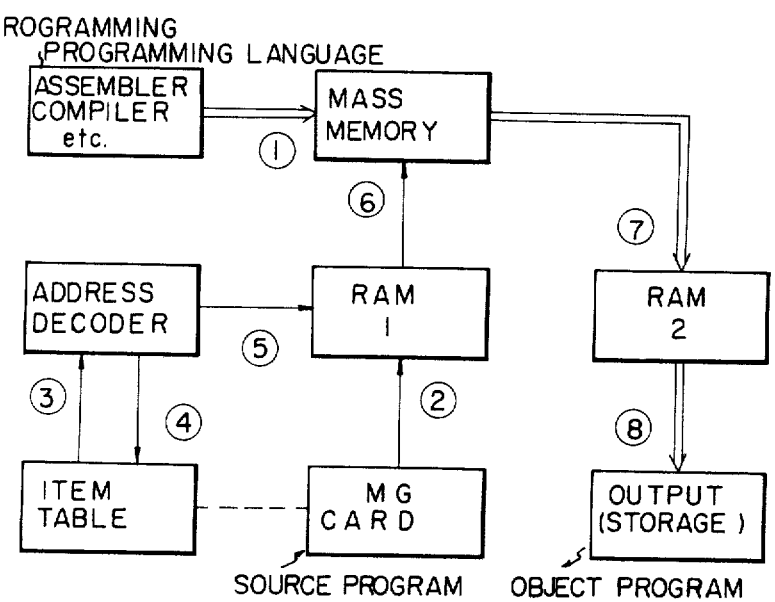

DATA STORAGE AND RETRIEVAL SYSTEM

This is a continuation-in-part appliction of U.S. Pat. application Ser. No. 582,193 filed May 30, 1975 (now abandoned).

BACKGROUND OF THE INVENTION:

1. Field of the Invention

This invention relates to a data storage and retrieval system and in more detail, to an information storage, retrieval and display system capable of retrieving an item by human language of communication and processing data stored in its corresponding address in a memory means which is coded in such terms as to be communicable with the digital processing system or computer.

2. Description of the Prior Art

Since a teletypewriter is used as a general input/output device in the conventional data processing system, it has merits, for example that the input/output and listing can be freely effected but as overlapped operations increase it become inefficient and the incremental of running cost due to occupation of them by an operator under exclusive contact therewith or the like occurs in numerical processing often effected, namely listing, management information or block-processing to deal with a group always collected such as a component list for a certain product and a classified table upon various purposes or specifications.

In order to reduce such inefficiency, abbreviated mnemonic codes for human words are commonly adopted instead of typing the full (alpha) character, however, mnemonic codes initiate another defect because they make the original meaning or nomenclature vague.

Recently, instead of operating many keys on a teletypewriter there has been developed a method for simlifying such processing by supplying numerical codes from digit keys to a data processing system but in this case there occurs other defects such as the inconvenience due to meaningless codes, and the reduction of reliability owing to encoding mistakes or the like.

SUMMARY OF THE PRESENT INVENTION

A main object of this invention is to provide a data storage and retrieval system having extensively optimum capabilities such as ease of operation for everyone, reduction of running cost attained using numerous identification tables and magnetic code translation cards as input/output devices of rapid operation, wherein this identification table is arranged to permit the writing of human characters and symbols thereinto, making it unnecessary to use meaningless codes and thus reducing encoding errors. Moreover, this invention provides a translating and editing menas for programs which can easily and quickly modify the various user's applications employing the user's written daily language.

An identification table representing a plurality of items overlaid on the selectively indicatable display board is constructed in the replaceable form as a whole, the numbers of the indicatable portions of the table being equal to the numbers of memory sections of said magnetic card. Data in the selected section of the corresponding magnetic card or data from the mass memory (internal or external) selected through the address code of the mass memory stored in the selected section of the corresponding magnetic card are rendered indictable due to retrieval and determination of items to be selected from human word(s) or symbol(s) visually written in said identification areas table, thereby making said data processable individually or to make data as to all sections or combination of certain accessible within or through the magnetic card processable as a whole.

Another object of this invention is to provide a data storage and retrieval system capable of easily identifying an individual data representing position by the same data layout as that in the listing so as to omit said overlapped operation and not to require a special allocating operation even in a condition such that group-display of data or group-print-out thereof is not effected, because there are a few format of data layout table which are useful for more frequently requested operation, for example, decimal classification, calendar layout of a month, calendar month and item space matrix, etc., and this device has functions of these three formats.

A further object of the invention is to provide a data storage and retrieval system for accomplishing diversification of recording classification and expansion of capacity within one item (address) whereby the respective persons in charge of management, sales, purchase, production, inventory, finance, marketing, etc., can always collect and deal with data independently from the other operators. Therefore, since it is possible to effect numerous classifications of identification tables (and magnetic cards) which relate closely to numerous variations of tasks, the respective persons in charge are the best operators of the device.

Moreover, use of floppy disc for mass memory practically enables infinite expansion of memory file, and therefore is extremely convenient for compilation. Floppy discs can be filed together with identification table and a magnetic card thus improving the efficiency factor of data storage economy.

A still further object of this invention is to provide a data processing system capable of use as an accounting machine, a cash register, a medical terminal device or the like by matching it with various programs and numerous formats inherent in such management and administration.

DESCRIPTION OF THE DRAWINGS:

FIG. 1 is a perspective view showing an embodiment of a data storage and retrieval system according to this invention as well as an address board, a magnetic card and an identification card which can be used with the system;

FIG. 2, comprising A - C, shows various address boards each capable of being used with the data system of FIG. 1;

FIG. 14 shows the relationship between only one item space of an item table and a related magnetic card and display on the address code display portion of the data display device; and FIG. 15 shows two typical usages of this invention.

Figure 3:
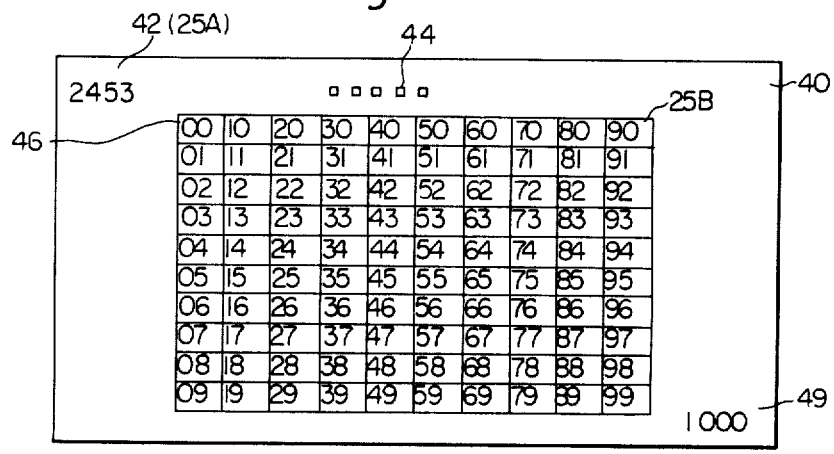
FIG. 3 shows an address board specially adapted for inventory control.

DESCRIPTION OF THE PREFERRED EMBODIMENTS:

FIG. 1 shows a typical layout of the data storge and retrieval system according to the present invention. In the same figure, part A shows an operating and identification display panel, part B shows an information display panel and a part C shows journal printer and cassette recorder housing.

Reference numeral 1 is an indicatable display portion comprising a translucent board 41 and indicating lamps (not shown) disposed within each rectangular area formed on the surface of the said board 41. Reference numeral 40 is a translucent or transparent identification table (hereinafter is referred as an ITEM table) having a plurality of rectangular areas formed thereon in the same manner as the board 41 and being adapted to directly type-write or to hand-write characters, numerals and symbols on a paper inserted thereinto, and some characters and numerals may be written into the margin of the ITEM table 40. For convenience of retrieval, subjects and classification numbers (may be file numbers) are written into the margin of the ITEM table 40 and into the margin of the magnetic data card 50 (hereinafter is referred as a MG card). It is recommended that they are stocked together in the same filing box for easy manual retrieval.

In operation, this ITEM table 40 is removably overlaid on a portion 1 of this device to directly access a necessary ITEM by depressing the selection keys of reference numeral 6 after inserting its corresponding MG card 50 into the slot of the card reader 60.

The keys 2 to 5 comprise respectively 10 decimal digit keys for data and code input or calculation, clear key C, memory key M for storing data and code, and call key A for information display.

The ITEM selection keys 6 comprise a plurality of keys arranged in the matrix form to select any one of one-hundred forty ITEms on the table 40 out by depressing a combination of two keys therein, then the lamp located in the matrix point of the depressed keys lights. The data of the TEM in the indicated area are directly accessed and are displayed by pressing CALL key 5, if data is memorized in their corresponding address of the mass memory as described hereinafter, on the display portion 21 or are stored in by pressing MEMORy key 4 after setting information by decimal digit keys 2 or the tele-type. This ITEM selection method is considered to be the most inexpensive and thus employed in this embodiment but other methods, for example, directly selecting said items by actuating a switch array arranged below translucent board 41 may be used.

In this way data of the selected ITEM of the same layout table, can be processed as many times as occasion demands, with a minimum of motion, to store, check, rewrite list up, duplicate or transfer, etc.

Reference numeral 7 is a LOAD key to transfer data from mass memory 80 to RAM (random access memory) 70. Reference numeral 8 is a STORE key to transfer data from RAM 70 to mass memory 80.

Reference numeral 12 is a mode key which selects two modes, ORIGINAL and TRANSACTION. Numeral 14 is a digital switch or a digital clock for date input as well as for date indication. The switches 16 to 18 comprise respectively a TYPE or PRINT switch, a RECORD switch for MG card 50 and a RECORD switch for the ID card 52.

The displaying parts 21 to 28 display respectively stored data, data to be changed or accumulated, etc., and of course, they can be replaced by a CRT display.

Reference numeral 30 is a alternative mode switch for the decimal digit key functions, CODE or DATA. Reference numeral 31 is a switch to set the allocation FORMAT coincidentally with a number displaying the ITEMs when it is selected from three tables A, B, and C of FIG. 2.

Reference numerals 32 to 39 are specially defined keys, for example, for calculations, special firm wear, or user's application program etc. Reference numeral 64 is a journal printer for printing stored, retrieved or changed data on the journal paper 65. Reference numeral 66 is a cassette recorder for transaction record etc.

FIG. 2 shows some examples of ITEM tables used in the device shown in FIG. 1. Table (A) is an ITEM suitable for the decimal classification system, table (B) is monthly record table arranged suitably for a daily data processing and a table (C) is an yearly record table arranged suitably for monthly data processing.

FIG. 3 shows the details of an ITEM table for decimal classification, wherein reference numeral 42 identifies a filing block code, 44 the place in which a title, theme, etc., may be written and 46 a space directly accessible on this machine and in which human characters are written for ITEM identification. Numerals in each rectangle represents the last two decimal digits of the address code of the ITEM therein corresponding to the local address of the address in the mass memory as described hereinafter, when this table is used for the serial code system.

Figure 4:
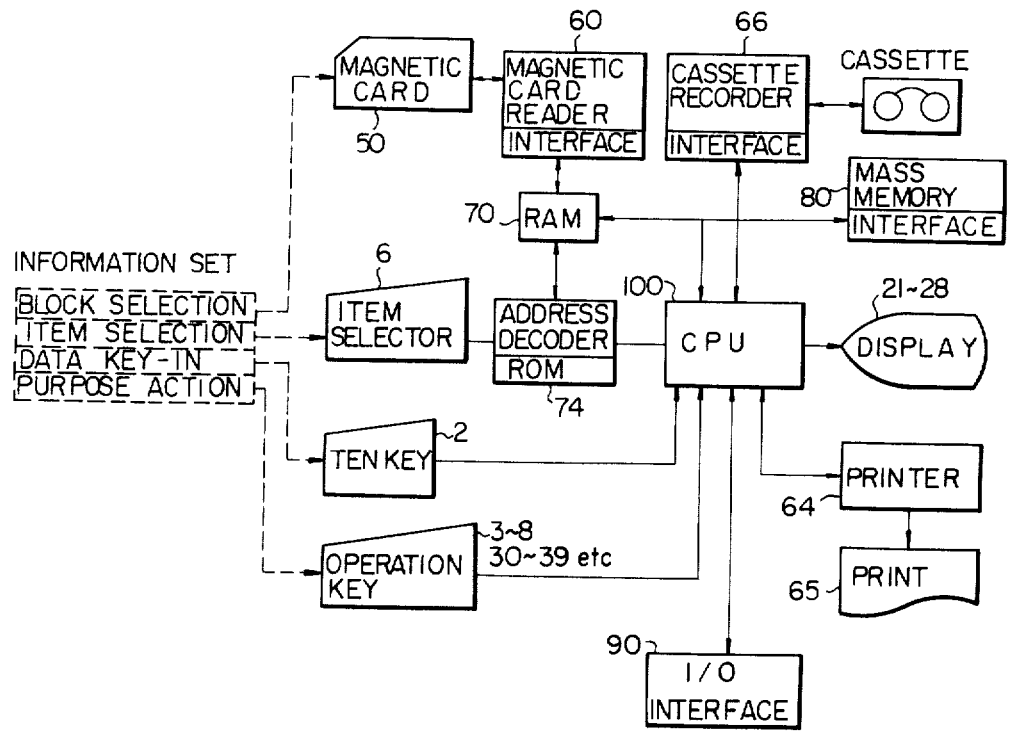
FIG. 4 is a typical block digram showing a major part of one embodiment of this invention.

FIG. 4 is a typical block diagram of the present invention, where the dotted lines show manual processing and the solid lines show automatic processing in the device.

Firstly, an ITEM table and a MG card filed in combination are picked up from the filing box (not shown), the ITEM table is set on the display portion 1 and the MG card is read in by the MG card reader 60. Next, the data is transferred from the mass memory 80 to Random Access Memory 70 by pressing the LOAD key 7 which is one of the operation keys. This transferring process is done through automatic identification the address codes of the mass memory 80 recorded in the MG card 50.

The address (local address) code of the ITEM selected by the ITEM selection key 6 is decoded by the address decoder ROM 74 which selects the corresponding address of RAM 70, so that the information therefrom can be displayed by pressing A key 5 or new information from the decimal digit keys (or the teletype) can be stored.

Electronic processing operation in this device is controlled by a Central Processing Unit (CPU) 100. Reference numeral 90 is an I/O interface which terminates at a teletype, a line printer, a CRT display, etc.

Figure 5:
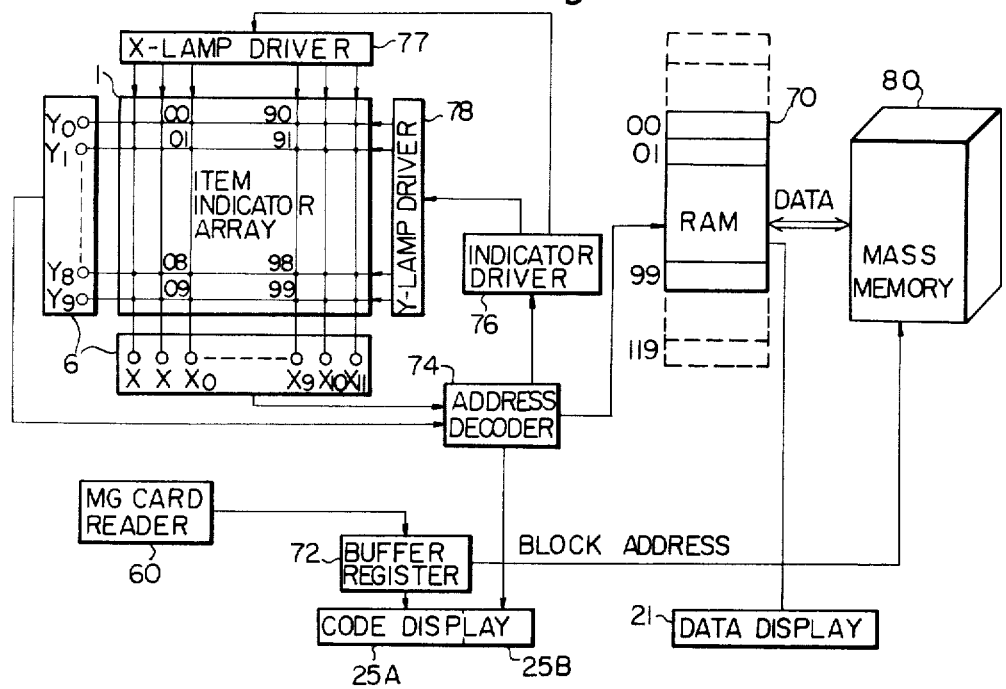
FIG. 5 is a more detailed block digram of a portion of FIG. 4.
Figure 6:
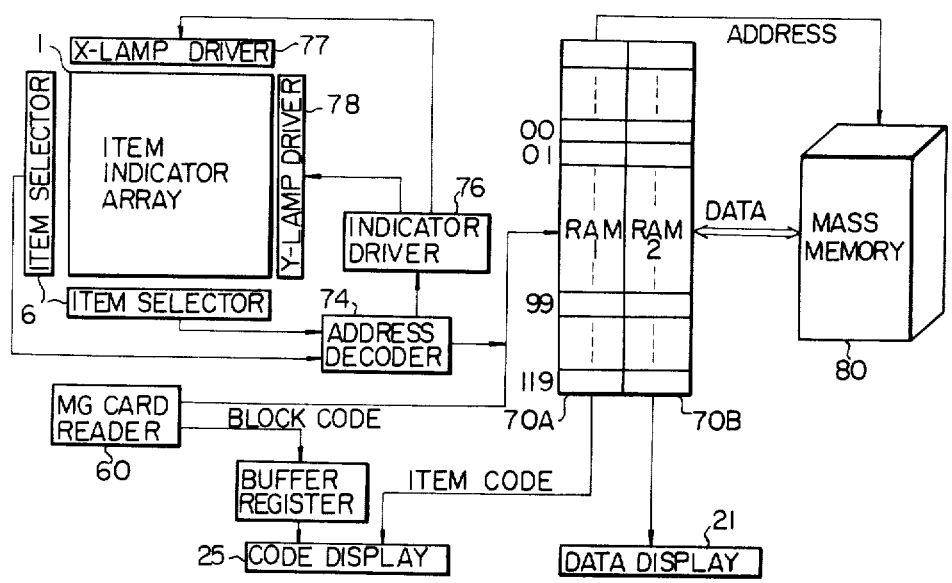
FIG. 6 is a modification of the embodiment shown in FIG. 5.

The block diagrams of FIG. 5 and FIG. 6 represent more detailed showing of the elements necessary to explain two typical modifications of the present invention.

The example in FIG. 5 shows the flow of the address code and the data according to a serial code system with the details of the matrix ITEM space (address) selection and indication in the ITEM table. As serial code machine, a reference numeral 25-A is a structure for displaying a filing block code recorded in a MG card coinciding with the filing block code written into the margin of the ITEM table.

First, upon reading an MG card 50 by the card reader 60, the filing block code is displayed on the display 25-A through the buffer memory 72, which holds the display 25-A and selects the filing block address (partition) comprising all but the last two digits of mass memory 80. Next, operation of the ITEM selection keys 6 initiates the address code which is decoded by the corresponding address decoder 74 and lights the indicator lamp (not shown) through the indicator driver 76 and lamp drivers 77 and 78, and at the same time selects the last two digits of the address code of the mass memory which is displayed in reference numeral 25-B, which is a structure for displaying any one of the numerals 00–99 corresponding to the numerals written in the selected rectangle on the ITEM table, thereby establishing the full address code representative of the selected ITEM together with the numerals (or alpha numeric) 25-A previously displayed in display 25-A. Then, when the call key 5 is depressed, the stored data in the RAM 70 at the address indicated in display 25 is displayed on the data display portion 21.

The example in FIG. 6, on the other hand, shows the flow of the address code and the data according to a random code system with a simplified diagram of the matrix ITEM space (address) selection and indication of ITEM table. Display 25-A and 25-B indicates together first the filing block code recorded in the MG card after insertion into the slot of the card reader 60, but next when the ITEM in the table is selected, the ITEM code (the address code of the mass memory) recorded in its corresponding address (local address) of the MG card is displayed, then the data in RAM 70 selected by the address code and transfered from the mass memory 80 is displayed on the display 21 by pressing call key 5.

Figure 7:
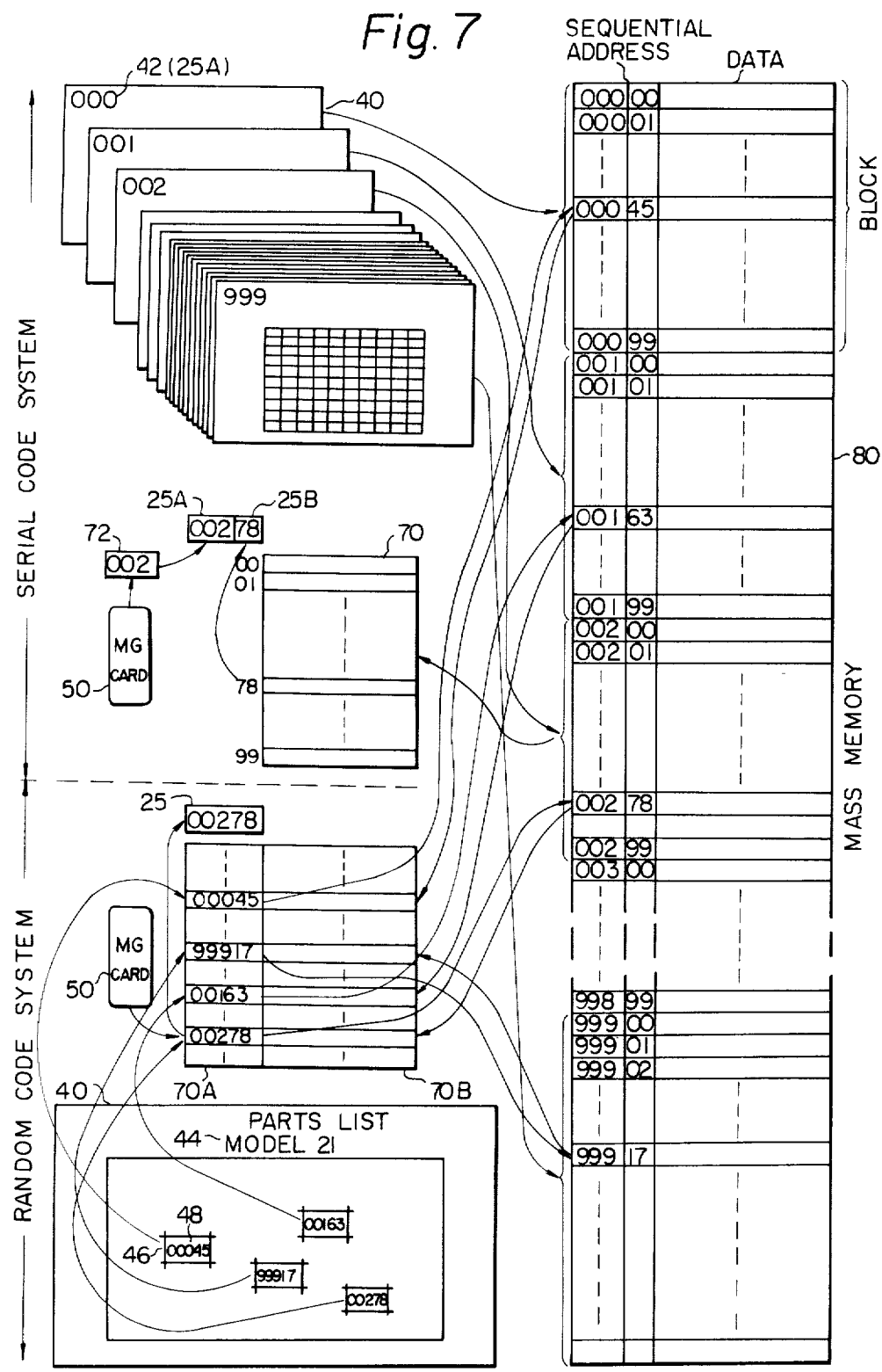
FIG. 7 is an explanatory view of the addressing operations according to this invention.

FIG. 7 shows the difference between the SERIAL code system and the RANDOM code system with the relationships among the ITEM table the, MG card and the MASS MEMORY on the address for data or information storage. In this example, the same 5 decimal digit sequential address codes is used for the convenience of easy understanding of the difference.

In the serial code system, the upper three digits of the address code represent a filing block address number and last two digit represent the local address number of 00–99. Since these 5 digits together establish 100,000 addresses, the system with a three decimal digits buffer memory an inner RAM of one hundred addresses and an outer same mass memory of 100,000 physical addresses can make an expansion of the storage capacity of nearly 1,000 times.

In the random code system, since the physical address codes of mass memory 80 are recorded in the MG card, they are independent from the filing block codes and the local address codes. Therefore, the address order can be altered freely in the ITEM tables and the MG cards. In this example, sequential address codes used in the mass memory are picked randomly and are freely laid out on the ITEm table, so arbitrary combinations can be produced from the same mass memory of 100,000 sequential addresses. Then, this free combination means that a free code addressing memory device can be used for the mass memory.

Figure 8:
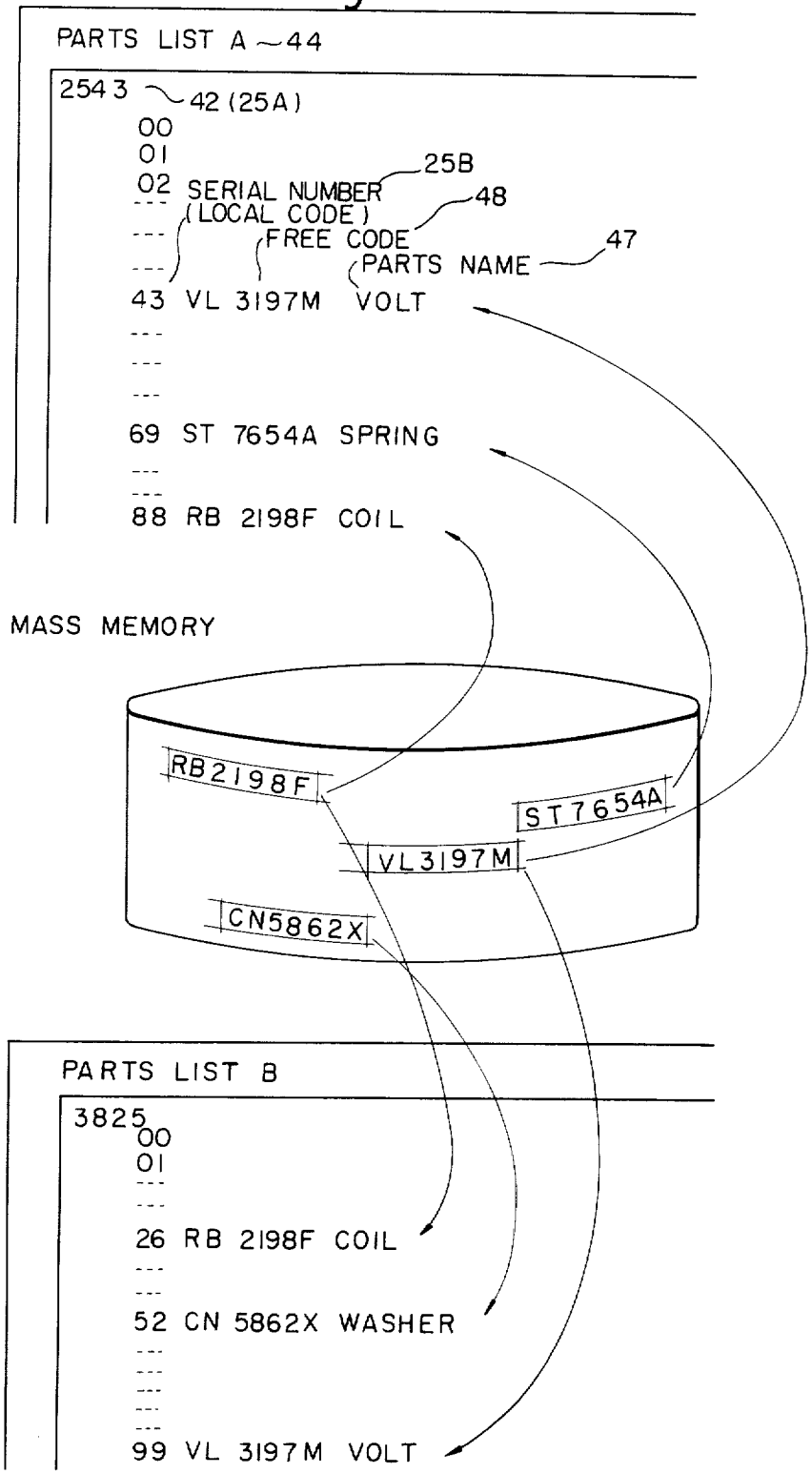
FIG. 8 is a view explaining in detail the random addressing operation shown in FIG. 7.

FIG. 8 shows an illustrative relationship between two different parts lists and the mass memory, wherein the same three parts are listed in each list but appear in a different order. In this figure, the parts lists are shown in common paper document style, but they are easily changed to ITEM tables for the present invention by coinciding the reference numerals with FIG. 3.

Figure 9:
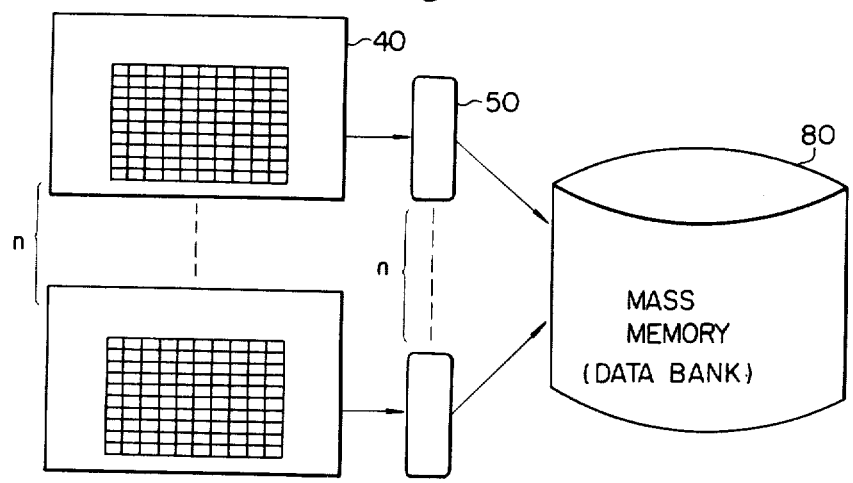
FIG. 9 shows the relationship between item tables, related magnetic cards and the mass memory.
Figure 10:
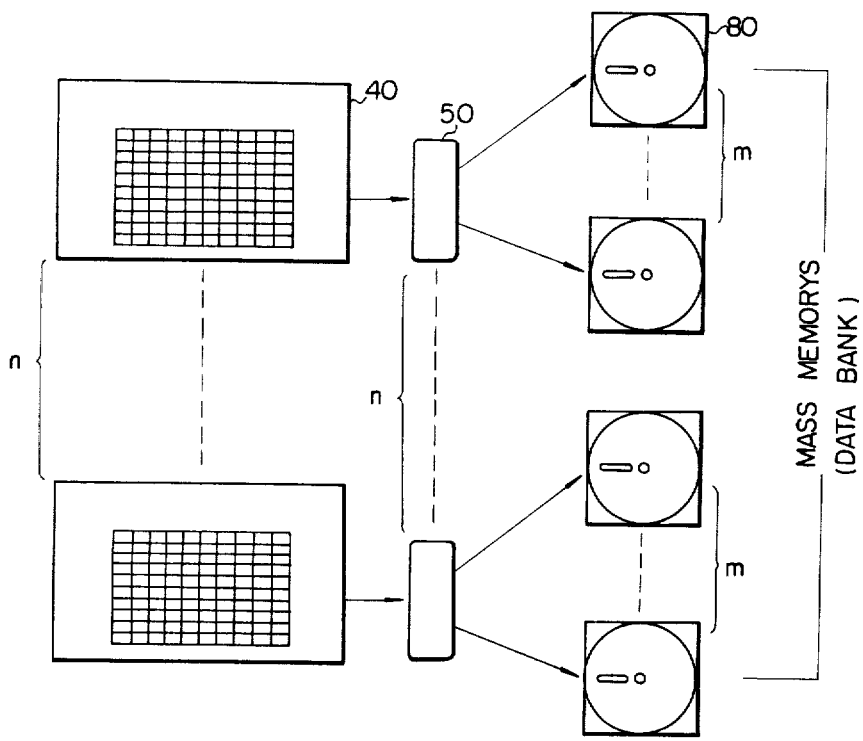
FIG. 10 shows the case where in FIG. 9 the mass memory is replaced by a changeable floppy discs.

FIG. 9 is a simplified diagram of FIG. 7, wherein a mass memory corresponds to many combinations of ITEM tables and MG cards. FIG. 10 shows, on the other hand, multiple mass memories corresponding to each combination of ITEM table and MG card having floppy discs for the mass memory. Accordingly the present invention makes the system smaller and capable of, substantially infinite expansion of information storage, with a most economical storage cost and easy manual retrieval of these sheets filed together by the nearest location of an operator.

The above explanation is considered to be sufficient an understanding of the address code and data flow in the invention. Further attention should now be directed to FIG. 11 and FIG. 12 which depict operational flow charts of the invention, for example, applied to inventory control of random code.

(A) Original Production

Figure 11:
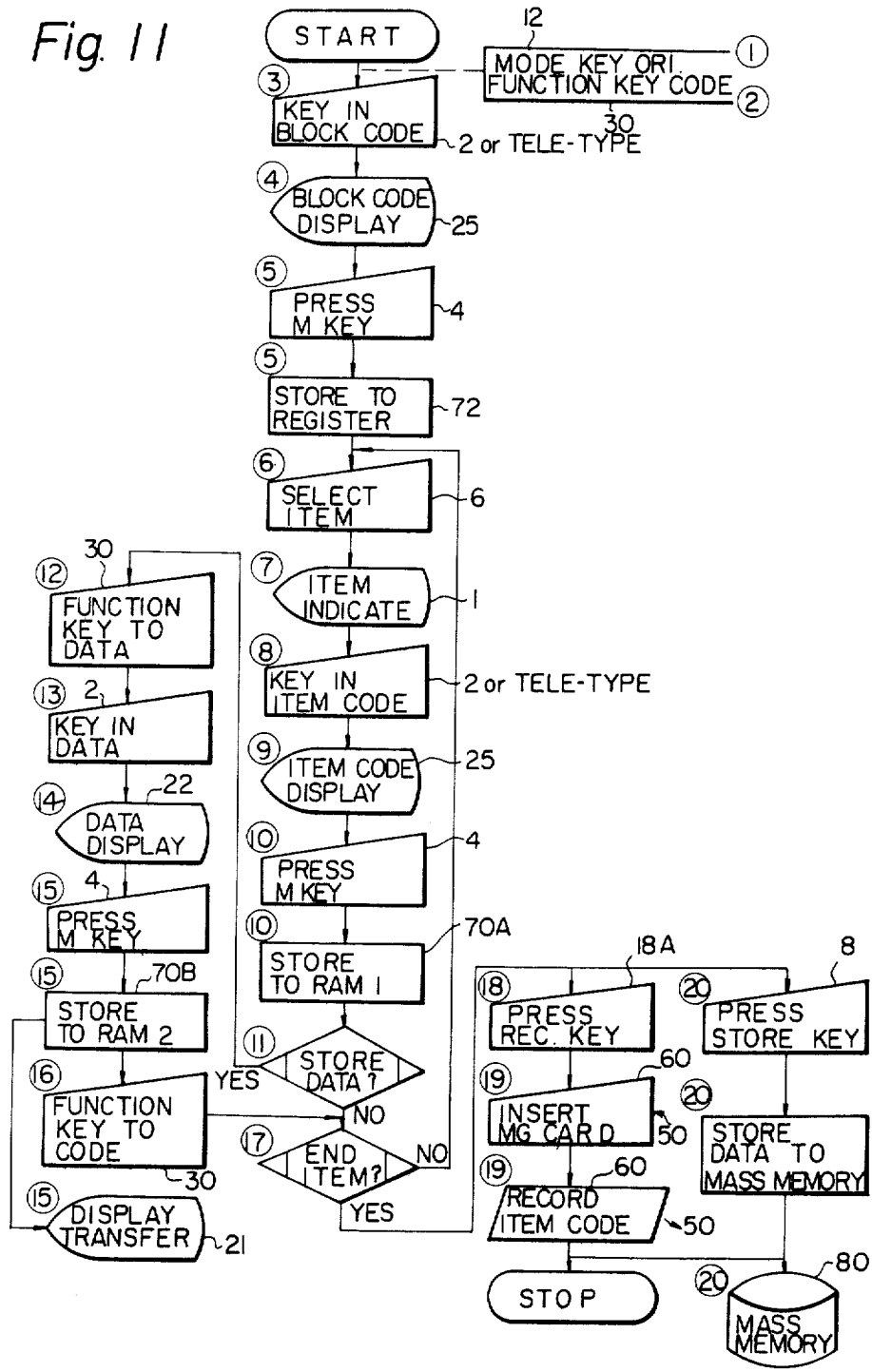
FIGS. 11 and 12 are flow charts as used for inventory control.

FIG. 11 shows the production of an ITEM table, a MG card and a MASTER file.
1. The mode key 12 is set to the ORI. position.
2. The function switch 30 is set to the CODE position.
3. The block code (or title) is keyed in by the decimal digit keys (or the teletype).
4. The keyed-in code (or title) is displayed on the display 25.
5. The displayed code (or title) is stored in the buffer register by pressing the M key 4.
6. Any ITEM space of the ITEM table is selected by the ITEM selection key 6 (of course, it is commonly selected in order from the desired top), and the description is written in the ITEm space 46 of the ITEM table.
7. The lamp in the selected ITEM space lights to indicate its location.
8. The ITEm code is keyed in by the decimal digit keys 2.
9. The keyed-in code is displayed on the display 25.
10. The displayed code is stored in the RAM 70A by pressing the M key 4.
11. Decide whether to key in data or not.

Note: the symbol of step 11, in FIG. 11 indicates that the judgement is made by human and not by the machine.

12. If the above step 11 is answered yes, the function key 30 is changed to the DATA position to key in the data.
13. The data is keyed in using the decimal digit keys 2.
14. The keyed-in data is displayed on the display portion 22.
15. The displayed data is stored in the RAM 70B by pressing the M key 4 and the displayed data is transferred to the display portion 21.

16. The function key 30 is changed to CODE position.
17. If there remains an unprocessed ITEM, return to step 6.

Note this is an operator decision.

18. After all ITEMs required in the same ITEm table are finished, press record key 18A.
19. ITEM codes are recorded in the MG card by inserting the MG card into the slot of the MG card reader 60.
20. Data stored in RAM 70B is transferred and stored to the mass memory 80 by pressing the STORE key 8. Whereby the production of the ITEm table, MG card and MASTER file is ended.

Figure 12:
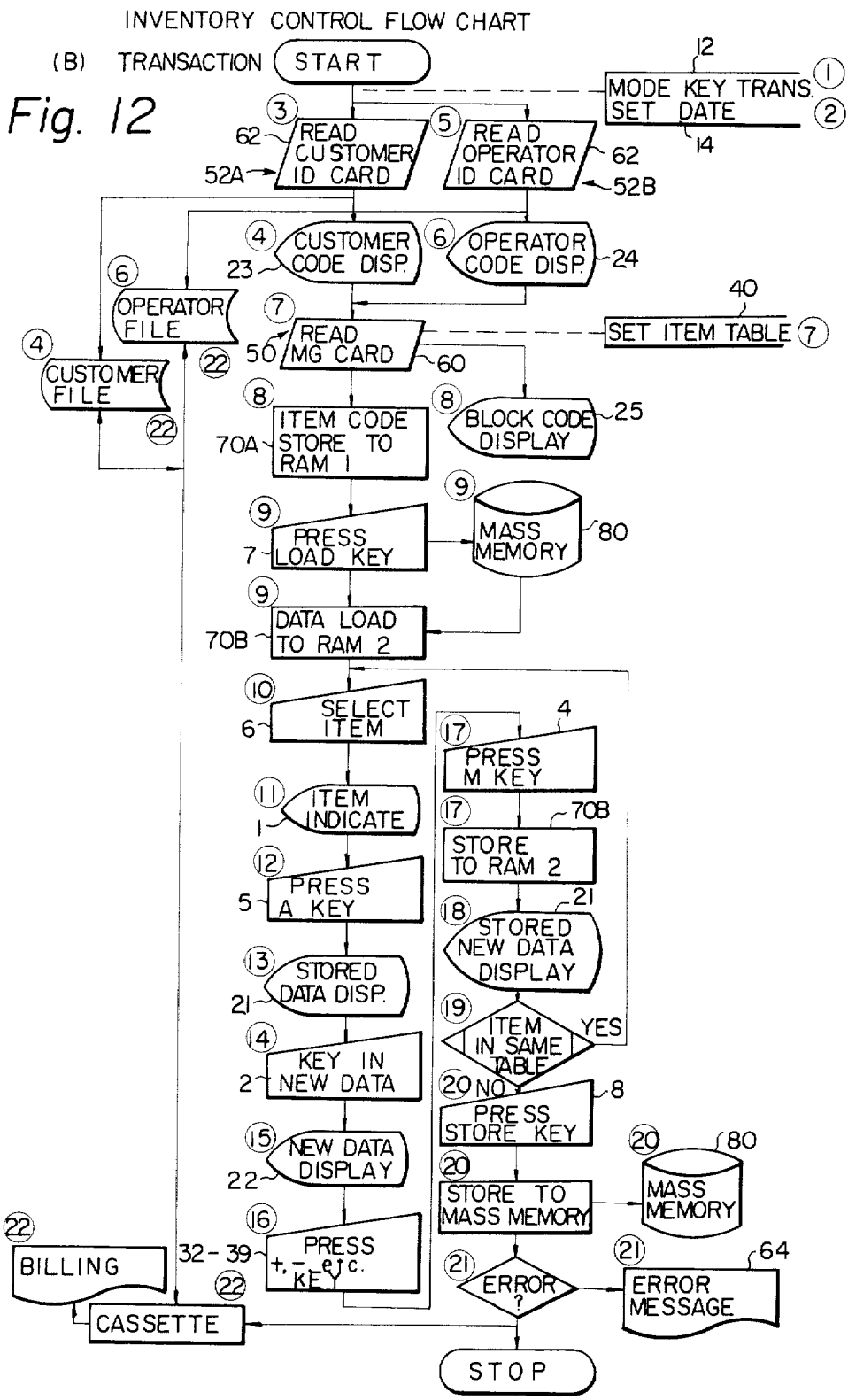

Next, an explanation is made with reference to FIG. 12 which shows the operation of daily inventory control.

(B) Transaction

1. The mode key 12 is set to the TRANS. position.
2. The digital switches are set to indicate the correct date on date display 14.
3. The customer ID card 52A is read by the ID card reader 62.
4. The customer code (or name) is displayed on the display 23, and customer documents are transferred to cassette 66.
5. The operator ID card 52B is read in by the ID card reader 62.
6. The operator code (or name) is displayed on the display 24, and operator documents are transferred to cassette 66.
7. An ITEM table 40 and an MG card 50 which have been identified with the same block code (or title or theme) and have been filed in combination in the same place (or file, etc.,) are selected and, then the ITEm table is positioned on the ITEM display portion 1, and the MG card 50 is read by the MG card reader 60.
8. The block code (or title or theme) is displayed on the display 25, and the ITEM codes are stored to the RAM 70A.
9. The data in the corresponding addresses of the mass memory are transferred to the RAM 70B by pressing the LOAD key 7.
10. Any ITEM of the ITEM table is selected by the ITEM selection key 6.
11. The lamp in the selected ITEM space lights to indicate its location.
12. Press A key.
13. The data of the selected ITEM stored in RAM 70B is displayed on the display 21.
14. Key in new data (quantity, price, etc.,) by the decimal digit keys 2.
15. The keyed-in data is displayed on the display 22.
16. In the case of stocking-in, stocking-out or price changes, the stocking-in (or +) key, the stocking-out (or −) key or data change key which is one of the specially defined keys 34-38 is actuated.
17. The new data calculated or changed is stored in RAM 70B by pressing the M key 4.
18. The stored new data is displayed on the display 21.
19. The operator decides whether to continue selection of an ITEM in same table or not, if so return to step 10.
20. The data stored in RAM 70B is transferred to the mass memory 80 by pressing the STORE key 8.
21. If there are discrepancies between data in RAM 70B and data in mass memory caused by the interruption of other terminal machines, the error message are printed out by the printer 65 or the teletype.
22. After completing all the transactions, the accumulated data in cassette 66 is printed out by the printer 64 or the teletype. Correct transactions are accumulated on the cassette tape for rewriting the customer and the operator files and also for billing.

Figure 13:
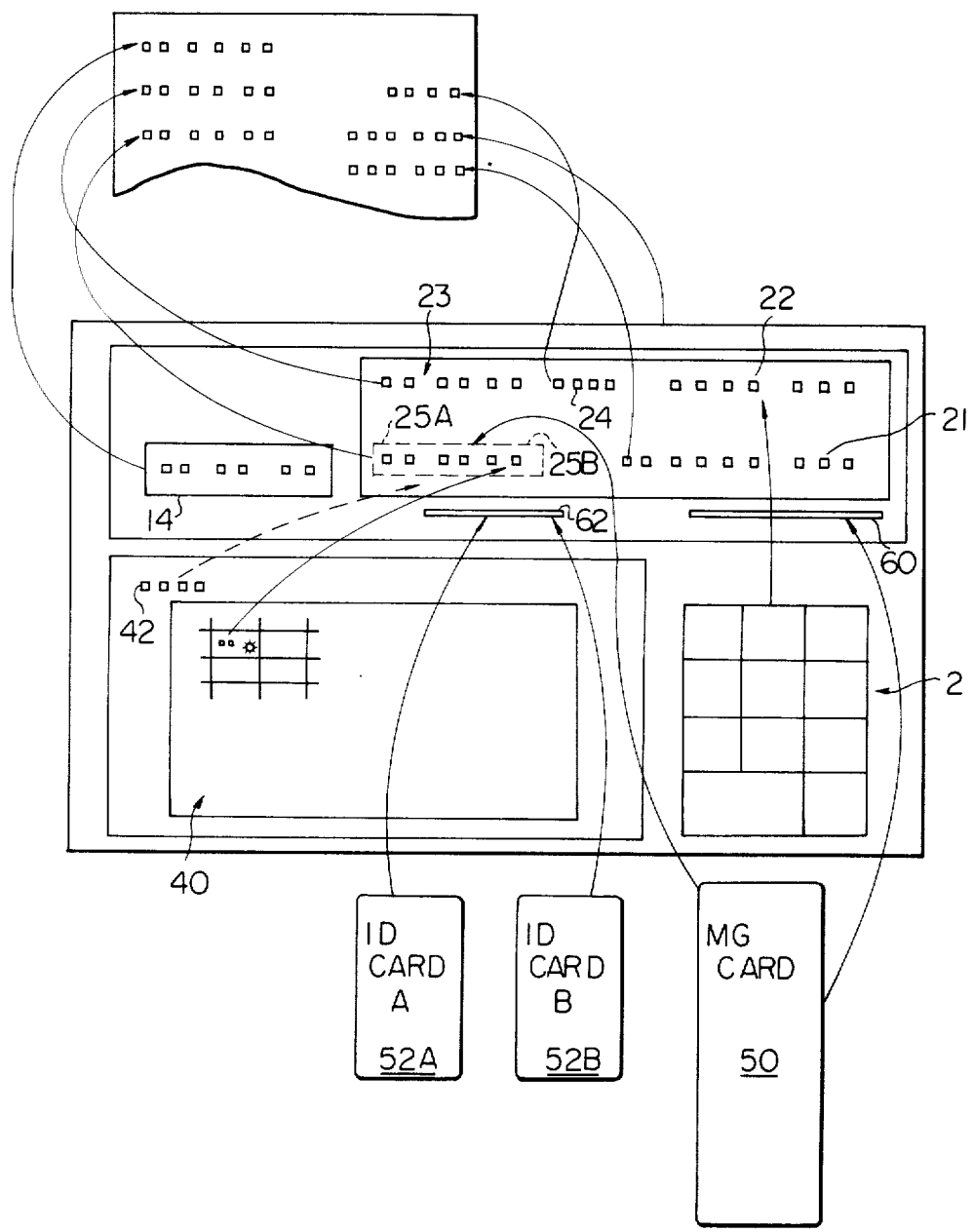
FIG. 13 is an explanatory view of one typical printout format as used for inventory control.

FIG. 13 shows an example of the relationship between the print-out format and the respective displays and the relationship between the ITEM table, the ID cards and the MG card. The figure should be reviewed reference in to the explanations accompanying FIG. 11 and FIG. 12. FIG. 14 shows the difference of indication of the display 25 between the serial code system and random code system for referencing the same ITEM.

FIG. 15 shows the most simplified block and flow diagrams of the present invention. Part (A) shows the above mentioned data processing case, which can be reviewed as follows. In this case, the master file has been already stored in the mass memory.

1. MG card is read into RAM 1 (70A).
2. The content of RAM 1 (70A) select the corresponding address of the mass memory as a whole.
3. All the data in said corresponding addresses are loaded into RAM 2.
4. The requested ITEM is selected.
5. The selected ITEM space is indicated.
6. The address of RAM 1 (70A) corresponding to the selected ITEM is selected.
7. The address of RAM 2 (70B) corresponding to the selected address of RAM 1 (70A) is selected.
8. If the data is changed, the changed data is restored to the corresponding address of the mass memory.

Part (B) is a block and flow diagram of the same device applied to programming. It will be helpful for understanding to explain with referring to (A).

1. Store the program language in the mass memory.
2. A MG card of programming word is read into RAM 1 (70A).
3. Select requested word.
4. The space of the requested word is indicated.
5. The address of the requested word in RAM 1 (70A) is selected.
6. The machine word of the requested word in mass memory is selected.
7. the appointed machine word is loaded into RAM 2 (70B).
8. If the RAM 2 (70B) is fully loaded by the requested word, the old word is stored in the outer memory.

Thus, difference between (A) and (B) is that (A) is primarily for random process while (B) is strictly for sequential process.

Consequently, the four fundamental functions such as serial address code, random address code, random storage and sequential storage employed in this processing device offer wide applications as a stand-alone (independent machine) as well as intelligent terminal of an effective peripheral of a computer.

What is claimed is:
1. A data storage and retrieval system comprising:
   a mass memory means for storing data at locations having plural digit addresses;
   a random access memory means having a plurality of first memory locations for storing in each of said locations a coded word corresponding to one plu- ral digit address of said mass memory means and a plurality of second memory locations each corresponding to one of said plurality of first memory locations for storing data;

a memory control means connected to said mass memory means and said random access memory means for reading the coded word stored in each of said first memory locations of said random access memory means and for storing in each of said second memory locations of said random access memory means the data stored in said mass memory means at the plural digit address which corresponds to said coded word stored in the respective first memory locations, and for storing in said mass memory means the data stored in each of said second memory locations of said random access memory means at the plural digit address of said mass memory means that corresponds to said coded word stored in the respective first memory locations;

a fixed display board having a plurality of display portions, each providing a selective indication by an indicator means;

a plurality of identification means having a plurality of identification portions corresponding to said plurality of display portions of said fixed display board for being mounted upon said fixed display board to identify each of said plurality of display positions;

an item selection means connected to said fixed display board for selecting one of a plurality of items each corresponding to one of said display positions identified by said identification means and for causing said corresponding indicator means to provide an indication of the selection;

a plurality of magnetic card memory means each corresponding to one of said plurality of identification means for storing data corresponding to at least part of a plural digit address of said mass memory means;

a magnetic card reading means for reading the data stored on said magnetic card memory means; and an address decoder means connected to said random access memory means, said item selection means and said magnetic card reading means for combining the data stored on said magnetic card memory means and the item selected by said item selection means to produce said coded word corresponding to a plural digit address of said mass memory means and for recording said coded word in at least one of said first memory locations of said random access memory means.

2. A data storage and retrieval system as claimed in claim 1, wherein:

said mass memory means comprises at least one removable and replaceable floppy disc.

3. A data storage and retrieval system as claimed in claim 1, wherein:

said fixed display board has one hundred display portions;

said identification means have one hundred identification portions;

said item selector means selects one of one hundred items corresponding to one one hundred identification portions of said identification means each representing the two least significant digits of a plural digit address of said mass memory means; and the data stored on said magnetic card memory means represents the digits exclusive of the two least significant digits of a plural digit address of said mass memory means, whereby $10^{n-2}-1$ sets of corresponding identification means and magnetic card memory means selected one set at a time enable said address decoder means to produce said coded words corresponding to the plural digit addresses of $10^n-1$ memory locations in said mass memory means, where n is the number of digits in the plural digit addresses of said mass memory means.

* * * * *